United States Patent
Odamura et al.

(10) Patent No.: US 6,880,992 B2
(45) Date of Patent: Apr. 19, 2005

(54) IN-MOLD MOLDED COMPONENT

(75) Inventors: Kozo Odamura, Shinjuku-ku (JP); Noboru Araki, Shinjuku-ku (JP); Satoshi Yamada, Shinjuku-ku (JP); Hitoshi Saito, Shinjuku-ku (JP)

(73) Assignee: Dai Nippon Printing Co., Ltd. (JP)

( * ) Notice: Subject to any disclaimer, the term of this patent is extended or adjusted under 35 U.S.C. 154(b) by 106 days.

(21) Appl. No.: 10/346,168

(22) Filed: Jan. 17, 2003

(65) Prior Publication Data
US 2003/0186009 A1 Oct. 2, 2003

(30) Foreign Application Priority Data
Jan. 22, 2002 (JP) .......................................... 2002-012580

(51) Int. Cl.[7] ................................................ B41J 35/28
(52) U.S. Cl. ........................ 400/208; 400/207; 400/242
(58) Field of Search ................................ 400/207, 208, 400/242; 242/118, 600

(56) References Cited

U.S. PATENT DOCUMENTS

| | | | | |
|---|---|---|---|---|
| 5,026,452 A | * | 6/1991 | Kodai | 156/293 |
| 6,059,469 A | * | 5/2000 | Hirumi | 400/208 |
| 6,099,178 A | * | 8/2000 | Spurr et al. | 400/207 |
| 6,227,643 B1 | * | 5/2001 | Purcell et al. | 347/19 |
| 6,386,772 B1 | * | 5/2002 | Klinefelter et al. | 400/208 |

* cited by examiner

Primary Examiner—Minh Chau
(74) Attorney, Agent, or Firm—Parkhurst & Wendel, L.L.P.

(57) ABSTRACT

There is provided a holding component for housing or holding a consumption article, which, in use, is detachably mounted in a printing apparatus, can be produced by a relatively simple method, can solve problems of tag separation and deteriorated positional accuracy, and can realize information communication in a stable and highly accurate manner. The in-mold molded component includes a holding component for housing or holding a consumption article, which, in use, is detachably mounted in a printing apparatus. Noncontact information storage means has been in-mold molded onto a part of the holding component so that the noncontact information storage means is bonded integrally to a substrate constituting the holding component.

9 Claims, 2 Drawing Sheets

IN-MOLD MOLDED COMPONENT

BACKGROUND OF THE INVENTION

1. Field of the Invention

The present invention relates to a holding component for housing or holding a consumption article which, in use, is detachably mounted in a printing apparatus, and more particularly to a molded component including noncontact information storage means for inputting information thereinto and outputting information therefrom through radio waves in a noncontact communication manner.

2. Prior Art

From the viewpoints of recycling and quality control, components and devices for housing or holding consumption articles which, in use, are detachably mounted in a printing apparatus, such as cassettes for ink ribbons, sheet feeding cassettes, or toner cartridges, are provided with information processing means for storing variable or fixed data. In this case, the data include data on the identity and history of the consumption articles and correction data.

Noncontact information storage means for inputting information thereinto and outputting information therefrom through radio waves in a noncontact communication manner is known as one of information processing means for use in the above application. The noncontact information storage means typically includes a transmitter and a receiver. The transmitter is provided in the body of a printing apparatus for information communication. The receiver is provided in a consumption member feeding device, such as an ink ribbon cassette, which is mounted within the body of the printing apparatus. The receiver functions to receive information from the transmitter. The transmitter and/or the receiver generally comprise, for example, an antenna and an IC chip for processing and storing data or signals which are carried by radio waves input into and output from the antenna. A communication system for information processing is called "RFID (radio frequency identification)".

A conventional method for mounting the noncontact information storage means is generally to apply a tag with a predetermined antenna, an IC chip and the like provided therein to a holding component in its predetermined portion with the aid of an adhesive or the like. The above method for applying and fixing the tag including the noncontact information storage means onto the surface of the component is relatively simple. In this method, however, concaves and convexes are unavoidably formed on the bonded portion of the tag. Further, this method is disadvantageous in that, since the tag can be relatively easily separated, forgery is induced. Furthermore, in this method, there is a certain limitation on an improvement in the positional accuracy with respect to the application with the adhesive or the like. This disadvantageously leads to a limitation on the stabilization of input/output (I/O) of information.

SUMMARY OF THE INVENTION

Under the above circumstances, the present invention has been made, and it is an object of the present invention to provide a holding component for housing or holding a consumption article, which, in use, is detachably mounted in a printing apparatus, can be produced by a relatively simple method, can solve problems of tag separation and deteriorated positional accuracy, and can realize information communication in a stable and highly accurate manner.

The above object can be attained by an in-mold molded component comprising: a holding component for housing or holding a consumption article which, in use, is detachably mounted in a printing apparatus; and noncontact information storage means which has been in-mold molded onto a part of the holding component so that the noncontact information storage means is bonded integrally to a substrate constituting the holding component.

In a preferred embodiment of the present invention, the noncontact information storage means comprises: an antenna for inputting information thereinto and outputting information therefrom in a noncontact manner through radio waves; and a storage element for information processing connected to the antenna.

Further, in a preferred embodiment of the present invention, the noncontact information storage means has been in-mold molded integrally with the substrate through a hot-melt adhesive layer so that the noncontact information storage means is exposed in a concave/convex-free state so as to be coplanar with the surface of the holding component.

In the present invention, preferably, in molding the substrate for constituting the holding component, a hot-melt adhesive layer is previously applied to a bonding surface of the noncontact information storage means and the substrate, together with the noncontact information storage means with the hot-melt adhesive layer applied onto its bonding surface, is subjected to in-mold molding, whereby the noncontact information storage means is in-mold molded integrally with the substrate of the holding component.

In the present invention, the hot-melt adhesive layer desirably has a thickness of 50 to 500 μm, preferably 200 to 300 μm, and, desirably, the hot-melt adhesive layer has a degree of thermal shrinkage in the range of 0 to 5%.

The hot-melt adhesive layer is preferably formed of at least one member selected from the group consisting of a polyester hot-melt adhesive, a modified olefin hot-melt adhesive, and a polyamide hot-melt adhesive.

In an embodiment of the present invention, the in-mold molded component is such that the holding component is, for example, a bobbin in a cassette for an ink ribbon of the printer, and the noncontact information storage means has been in-mold molded integrally with the end face of a flange part provided at the end of the bobbin.

DETAILED DESCRIPTION OF THE INVENTION

The in-mold molded component according to the present invention includes a holding component for housing or holding a consumption article which, in use, is detachably mounted in a printing apparatus. Noncontact information storage means has been in-mold molded onto a part of the holding component so that the noncontact information storage means is bonded integrally to a substrate constituting the holding component. A preferred embodiment of the present invention, together with a production process, will be described with reference to the accompanying drawings.

Figure 1:
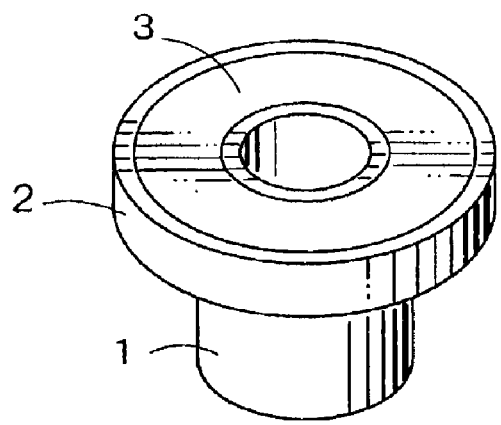
FIG. 1 is a perspective view of a bobbin for an ink ribbon according to an embodiment of the present invention.
Figure 2:
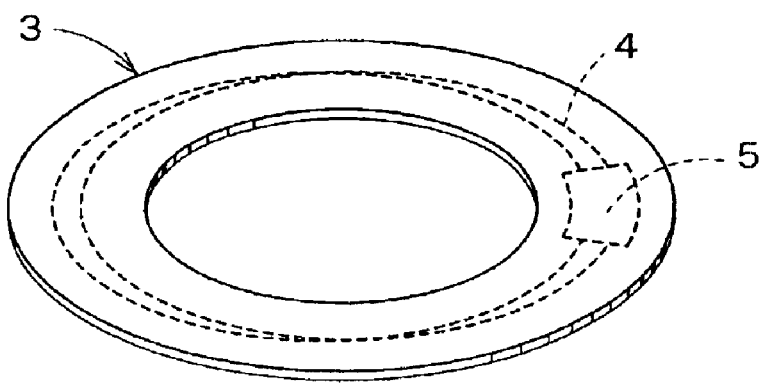
FIG. 2 is a perspective view of an RFID tag for use in a bobbin according to an embodiment of the present invention.

FIG. 1 is an embodiment of the application of the present invention to a bobbin used in a cassette for an ink ribbon in a thermal transfer printer. The bobbin comprises a cylindrical core 1, a donut-shaped flange part 2 provided at the end of the core, and an RFID (radio frequency identification) tag 3 as noncontact information storage means which has been in-mold molded in the flange part 2. As shown in FIG. 2, this RFID tag 3 basically comprises an antenna 4 and a storage element 5. The antenna is embedded in the tag substrate and performs input/output (I/O) of information in a noncontact manner through radio waves. The storage element 5 is provided for information processing and is connected to the antenna.

Figure 3:
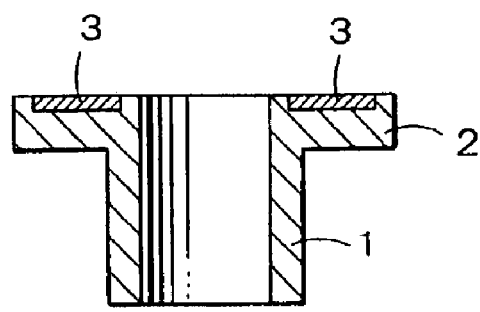
FIG. 3 is a cross-sectional view of a bobbin according to an embodiment of the present invention.

FIG. 3 is a cross-sectional view of the bobbin according to this embodiment. As shown in the drawing, an RFID tag 3 has been in-mold molded in a flange part 2. In this case, the RFID tag 3 has been integrally in-mold molded through a hot-melt adhesive layer (not shown) so that the RFID tag 3 is exposed in a concave/convex-free state so as to be coplanar with the surface of the flange part 2.

The bobbin body and the flange part according to this embodiment are integrally formed by a single molding method. The material for constituting the bobbin body and the flange part may be properly selected according to applications. In general, however, the bobbin for an ink ribbon may be formed of, for example, a PS resin or an ABS resin.

Figure 4:
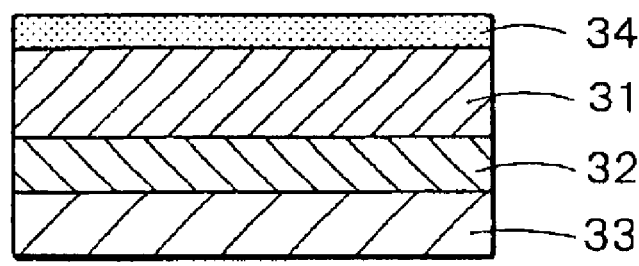
FIG. 4 is a cross-sectional view of an RFID tag according to an embodiment of the present invention.

FIG. 4 is a schematic cross-sectional view of an embodiment of an RFID tag used in the present invention. For example, the RFID tag may include a storage element layer 31, an adhesive layer 32, and a support layer 33 stacked on top of one another in that order. In this case, the storage element layer 31 may comprise, for example, a copper antenna and an IC chip, and the support layer 33 may comprise a white PET or the like for supporting or protecting the storage element layer 31. Further, in the present invention, preferably, as described later, the RFID tag, together with a bobbin substrate, is in-mold molded through a hot-melt adhesive layer 34.

A resin having better compatibility with or adhesive properties to the resin material constituting the bobbin body is preferably selected as the resin for constituting the hot-melt adhesive layer. The hot-melt adhesive layer is preferably formed of at least one member selected from the group consisting of a polyester hot-melt adhesive, a modified olefin hot-melt adhesive, and a polyamide hot-melt adhesive. The thickness of the hot-melt adhesive layer may be selected by taking into consideration the type and size of the holding component produced. In general, however, when the strength of bonding to the substrate, the shrinkage of the substrate resin at the time of molding and the like are taken into consideration, the thickness of the hot-melt adhesive layer is suitably in the range of 50 $\mu$m to 500 $\mu$m, preferably in the range of 200 $\mu$m to 300 $\mu$m. The degree of thermal shrinkage of the hot-melt adhesive layer is preferably in the range of 0 to 5% from the viewpoint of preventing cracking in the chip at the time of molding.

Figure 5:
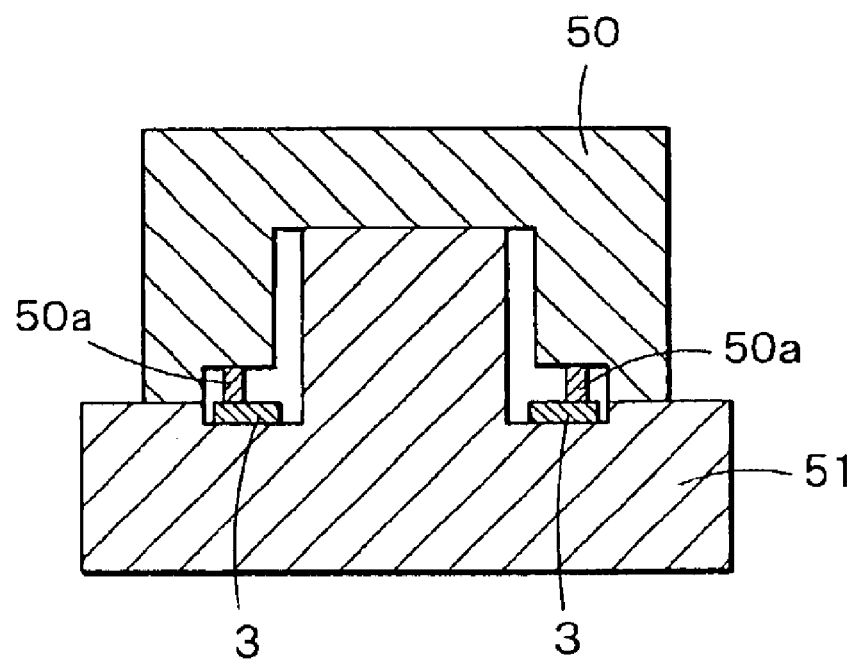
FIG. 5 is a cross-sectional view of a mold for molding a bobbin according to an embodiment of the present invention.

FIG. 5 is a cross-sectional view showing an embodiment of a mold used in the production of the bobbin as the in-mold molded component of the present invention by in-mold molding.

Specifically, the mold comprises a pair of an upper mold 50 and a lower mold 51 which cooperatively define a molding shape of the bobbin, and convexes 50a for press-fixing the RFID tag 3 are provided at given intervals in the upper mold 50 in its portion for constituting the flange part. Prior to the disposition of the RFID tag 3 within the mold, the above-described hot-melt adhesive layer is formed on the face of the RFID tag 3 in its flange part side. A predetermined resin for the substrate is poured into the mold to perform in-mold molding, whereby integration of the RFID tag 3 with the molded component and strong bonding of the RFID tag 3 to the molded component are simultaneously carried out to provide the in-mold molded component of the present invention.

As described above, in the in-mold molded component according to the present invention, the RFID tag is integrated by in-mold molding so that the surface of the RFID tag is exposed on the body of the component. Therefore, the RFID tag can be provided with high positional accuracy. Further, the RFID tag can be formed so that the surface of the RFID tag is exposed in a concave/convex-free state on the surface of the component. By virtue of this, the distance of the surface of the RFID tag from a read/write device can be minimized, and data processing can be further stabilized. Furthermore, the integral in-mold structure is advantageous, for example, from the viewpoint of avoiding problems of contact or friction with other constituent members. Furthermore, since an RFID tag can be easily embedded in a previously designed predetermined holding component, the need to change the design of the structure of the corresponding existing printing apparatus can be eliminated, and, thus, this is also cost effective.

Further, as described above, in the in-mold molded component of the present invention, when the RFID tag is integrally molded through a specific hot-melt adhesive layer, the body of the component can be strongly bonded integrally to the RFID tag. As a result, the RFID tag can be no longer separated from the body of the component without breaking the RFID tag. This is also advantageous from the viewpoint of preventing forgery.

What is claimed is:

1. An in-mold molded component comprising: a holding component for housing or holding a consumption article that, in use, is detachably mounted in a printing apparatus; and noncontact information storage means that has been in-mold molded onto a part of the holding component so that the noncontact information storage means is bonded integrally to a substrate constituting the holding component, said noncontact information storage means having been in-mold molded integrally with the substrate through a hot-melt adhesive layer so that the noncontact information storage means is exposed in a concave/convex-free state so as to be coplanar with the surface of the holding component.

2. The in-mold molded component according to claim 1, wherein the noncontact information storage means comprises: an antenna for inputting information thereinto and outputting information therefrom in a noncontact manner through radio waves; and a storage element for information processing connected to the antenna.

3. The in-mold molded component according to claim 1, wherein, in molding the substrate for constituting the holding component, a hot-melt adhesive layer is previously applied to a bonding surface of the noncontact information storage means and the substrate, together with the noncontact information storage means with the hot-melt adhesive layer applied onto its bonding surface, is subjected to in-mold molding.

4. The in-mold molded component according to claim 1, wherein the hot-melt adhesive layer has a thickness of 50 to 500 $\mu$m.

5. The in-mold molded component according to claim 4, wherein the hot-melt adhesive layer has a degree of thermal shrinkage in the range of 0 to 5%.

6. The in-mold molded component according to claim 4, wherein the hot-melt adhesive layer has a thickness of 200 to 300 μm.

7. The in-mold molded component according to claim 6, wherein the hot-melt adhesive layer has a degree of thermal shrinkage in the range of 0 to 5%.

8. The in-mold molded component according to claim 1, wherein the holding component is a bobbin in a cassette for an ink ribbon of the printer and the noncontact information storage means has been in-mold molded integrally with the end face of a flange part provided at the end of the bobbin.

9. The in-mold molded component according to claim 1, wherein the hot-melt adhesive layer is at least one member selected from the group consisting of a polyester hot-melt adhesive, a modified olefin hot-melt adhesive, and a polyamide hot-melt adhesive.

* * * * *